(12) United States Patent
Liu (10) Patent No.: US 12,217,529 B2
(45) Date of Patent: Feb. 4, 2025

(54) FINGERPRINT IDENTIFICATION SUBSTRATE, ELECTRONIC APPARATUS AND FINGERPRINT IDENTIFICATION METHOD (71) Applicant: BOE TECHNOLOGY GROUP CO., LTD., Beijing (CN)

(72) Inventor: Hao Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/907,939

(22) PCT Filed: Sep. 29, 2021

(86) PCT No.: PCT/CN2021/121740
§ 371 (c)(1),
(2) Date: Aug. 29, 2022

(87) PCT Pub. No.: WO2023/050163
PCT Pub. Date: Apr. 6, 2023

(65) Prior Publication Data
US 2024/0193983 A1 Jun. 13, 2024

(51) Int. Cl.
G06F 3/044 (2006.01)
G06V 40/13 (2022.01)
(52) U.S. Cl.
CPC ...... G06V 40/1306 (2022.01); G06V 40/1329 (2022.01)

(58) Field of Classification Search
CPC ...... G06F 3/042; G06F 3/0412; G06F 3/0416; G06F 3/044; G06V 40/1318;
(Continued)

(56) References Cited

U.S. PATENT DOCUMENTS 11,036,958 B2 * 6/2021 Sun ............ H10K 71/00
2016/0171274 A1 * 6/2016 Franza ............ G06V 40/1306
382/124

(Continued)

FOREIGN PATENT DOCUMENTS

CN 104035615 A 9/2014
CN 106096595 A 11/2016
(Continued)

Primary Examiner — Olga V Merkoulova
(74) Attorney, Agent, or Firm — BROOKS KUSHMAN P.C.

(57) ABSTRACT

The present disclosure provides a fingerprint identification substrate, an electronic apparatus and a fingerprint identification method. The fingerprint identification substrate includes a base substrate, a driving circuitry layer arranged on the base substrate, a shielding layer arranged at a side of the driving circuitry layer away from the base substrate and a detection electrode arranged at a side of the shielding layer away from the base substrate. The detection electrode is electrically coupled to a fingerprint detection circuitry arranged on the driving circuitry layer, the shielding layer is insulated from the detection electrode, and an orthogonal projection of the shielding layer onto the base substrate at least partially overlaps an orthogonal projection of the detection electrode onto the base substrate.

19 Claims, 7 Drawing Sheets (58) Field of Classification Search
CPC ............ G06V 10/147; H01L 27/14623; H01L 27/14612; H01L 27/1255
See application file for complete search history.

(56) References Cited

U.S. PATENT DOCUMENTS

| | | |
|---|---|---|
| 2016/0283000 A1 | 9/2016 | Wang et al. |
| 2017/0140194 A1* | 5/2017 | Qin .................... G06V 40/1306 |
| 2017/0255810 A1* | 9/2017 | Liu .................... H01L 27/14623 |
| 2017/0286740 A1* | 10/2017 | Liu .................... G06V 40/1306 |
| 2019/0065809 A1 | 2/2019 | Li et al. |
| 2019/0138782 A1* | 5/2019 | Zhang .................... G06F 3/044 |
| 2019/0220644 A1* | 7/2019 | Sun .................... H10K 50/844 |

FOREIGN PATENT DOCUMENTS

| | | |
|---|---|---|
| CN | 112379542 A | 2/2021 |
| KR | 101502911 B1 | 3/2015 |
| KR | 101855648 B1 | 5/2018 |

* cited by examiner

FINGERPRINT IDENTIFICATION SUBSTRATE, ELECTRONIC APPARATUS AND FINGERPRINT IDENTIFICATION METHOD

CROSS-REFERENCE TO RELATED APPLICATION

This application is the U.S. national phase of PCT Application No. PCT/CN2021/121740 filed on Sep. 29, 2021, which is incorporated herein by reference in its entirety.

TECHNICAL FIELD

The present disclosure relates to the field of fingerprint identification, in particular to a fingerprint identification substrate, an electronic apparatus and a fingerprint identification method.

BACKGROUND

With the development of technology, a fingerprint identification function, e.g., a self-capacitive fingerprint identification function, is supported in many electronic apparatuses. Generally speaking, a self-capacitive fingerprint identification structure detects a capacitance between a valley of a detected fingerprint and an electrode plate of a sensing unit and a capacitance between a ridge of the detected fingerprint and the electrode plate of the sensing unit, determines the valley and the ridge of the finger in accordance with a difference between the capacitances, and generates an image, so as to achieve the fingerprint identification function.

SUMMARY

In one aspect, the present disclosure provides in some embodiments a fingerprint identification substrate, including: a base substrate, a driving circuitry layer arranged on the base substrate, a shielding layer arranged at a side of the driving circuitry layer away from the base substrate and a detection electrode arranged at a side of the shielding layer away from the base substrate. The detection electrode is electrically coupled to a fingerprint detection circuitry arranged on the driving circuitry layer, the shielding layer is insulated from the detection electrode, and an orthogonal projection of the shielding layer onto the base substrate at least partially overlaps an orthogonal projection of the detection electrode onto the base substrate.

In a possible embodiment of the present disclosure, the shielding layer is coupled to a grounded line.

In a possible embodiment of the present disclosure, the shielding layer is electrically coupled to an excitation signal source to obtain an excitation signal from the excitation signal source.

In a possible embodiment of the present disclosure, the fingerprint detection circuitry includes a first switching transistor, a second switching transistor and an output circuitry. Each of the first switching transistor and the second switching transistor includes a control electrode, a first electrode and a second electrode. The control electrode of the first switching transistor is coupled to a charge control signal source, the first electrode of the first switching transistor is coupled to a charge signal source, and the second electrode of the first switching transistor is electrically coupled to the detection electrode. The control electrode of the second switching transistor is electrically coupled to a discharge detection control signal source, the first electrode of the second switching transistor is electrically coupled to the detection electrode, and the second electrode of the second switching transistor is electrically coupled to the output circuitry. The output circuitry is configured to output a collected fingerprint signal.

In a possible embodiment of the present disclosure, the output circuitry includes an amplifier and a feedback capacitor. The amplifier includes a positive electrode, a negative electrode and an output electrode, the negative electrode of the amplifier is coupled to the second electrode of the second switching transistor, the positive electrode of the amplifier is coupled to a reference signal source, and the output electrode of the amplifier is coupled to an output signal end to output the collected fingerprint signal. A first end of the feedback capacitor is coupled to the negative electrode of the amplifier, and a second end of the feedback capacitor is coupled to the output electrode of the amplifier.

In a possible embodiment of the present disclosure, the output circuitry further includes a reset sub-circuitry, two ends of the reset sub-circuitry are coupled to the negative electrode and the output electrode of the amplifier respectively, and the reset sub-circuitry is configured to enable the negative electrode of the amplifier to be electrically coupled to or electrically decoupled from the output electrode of the amplifier under the control of a reset signal.

In a possible embodiment of the present disclosure, the detection electrode is electrically coupled to the first switching transistor and the second switching transistor through a via hole penetrating through the shielding layer, the orthogonal projection of the shielding layer onto the base substrate covers an orthogonal projection of a semiconductor layer of the first switching transistor onto the base substrate, and the orthogonal projection of the shielding layer onto the base substrate covers an orthogonal projection of a semiconductor layer of the second switching transistor onto the base substrate.

In a possible embodiment of the present disclosure, the fingerprint identification substrate includes a first gate metal layer, a second gate metal layer, a first source/drain metal layer, a second source/drain metal layer and a first electrode layer in a direction away from the base substrate, the first gate metal layer includes a plurality of first gate electrode patterns and first signal line patterns, the second gate metal layer includes a plurality of second gate electrode patterns, the first gate electrode pattern and the second gate electrode pattern form a gate electrode of a switching transistor, the first source/drain metal layer includes a source/drain pattern and a second signal line pattern, the second source/drain metal layer includes a shielding layer pattern, the source/drain pattern forms a source electrode and a drain electrode of the switching transistor, the shielding layer pattern forms the shielding layer, the first electrode layer includes a plurality of first electrode patterns, and the first electrode pattern forms the detection electrode.

In a possible embodiment of the present disclosure, the shielding layer pattern includes a parting line extending from the via hole to an edge of the shielding layer pattern.

In a possible embodiment of the present disclosure, the first signal line pattern is configured to form one or more of: a first signal line configured to transmit a charge control signal provided by the charge control signal source; and a second signal line configured to transmit a discharge detection control signal provided by the discharge detection control signal source.

In a possible embodiment of the present disclosure, the second signal line pattern is configured to form one or more of: a third signal line configured to transmit a charge signal provided by the charge signal source; and a fourth signal line configured to output a signal detected by the detection electrode.

In another aspect, the present disclosure provides in some embodiments an electronic apparatus including the above-mentioned fingerprint identification substrate.

In a possible embodiment of the present disclosure, the fingerprint identification substrate includes an identification region and a peripheral region, both the shielding layer and the detection electrode are arranged in the identification region, and the peripheral region is provided with one or more of the excitation signal source, the charge control signal source, the charge signal source, and the discharge detection control signal source.

In yet another aspect, the present disclosure provides in some embodiments a fingerprint identification method for the above-mentioned electronic apparatus, including: inputting, by the excitation signal source, the excitation signal to the shielding layer and obtaining, by the detection electrode, a fingerprint signal; and generating fingerprint information in accordance with the fingerprint signal.

In a possible embodiment of the present disclosure, the inputting, by the excitation signal source, the excitation signal to the shielding layer and obtaining, by the detection electrode, the fingerprint signal includes: inputting the excitation signal to the shielding layer, inputting the charge control signal to the control electrode of the first switching transistor, inputting the charge signal to the first electrode of the first switching transistor, inputting the discharge detection control signal to the control electrode of the second switching transistor, inputting the reset signal to the reset sub-circuitry, and receiving the fingerprint signal from the output circuitry. A rising edge of the excitation signal corresponds to a falling edge of the reset signal and a rising edge of the charge control signal, a rising edge of the reset signal corresponds to a falling edge of the charge control signal and a falling edge of the charge signal, a falling edge of the excitation signal is arranged after the rising edge of the reset signal, a falling edge of an initial reset signal is arranged between the rising edge of the reset signal and the falling edge of the excitation signal, a rising edge of the discharge detection control signal corresponds to the falling edge of the excitation signal and the falling edge of the charge signal, a rising edge of the charge signal is arranged after the falling edge of the excitation signal and corresponds to a falling edge of the discharge detection control signal, a rising edge of the initial reset signal is arranged after the falling edge of the discharge detection control signal, a start of the fingerprint signal corresponds to the rising edge of the discharge detection control signal, and an end of the fingerprint signal corresponds to the falling edge of the initial reset signal.

BRIEF DESCRIPTION OF THE DRAWINGS

In order to illustrate the technical solutions of the embodiment of the present disclosure in a clearer manner, the drawings desired for the embodiment of the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

The present disclosure provides in some embodiments a fingerprint identification substrate.

Figure 1:
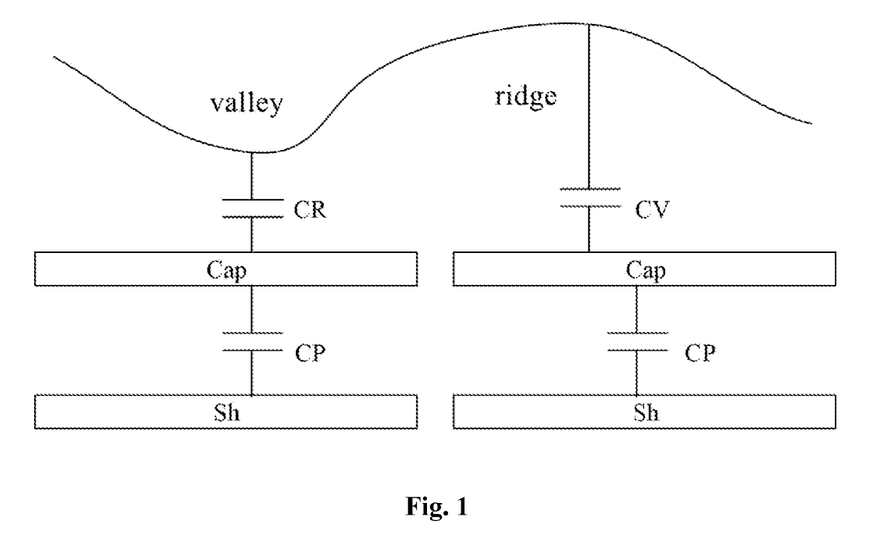
FIG. 1 is a schematic view showing a fingerprint identification scene according to one embodiment of the present disclosure.

As shown in FIG. 1, in the embodiments of the present disclosure, the fingerprint identification substrate includes a base substrate, a driving circuitry layer arranged on the base substrate, a shielding layer Sh arranged at a side of the driving circuitry layer away from the base substrate and a detection electrode Cap arranged at a side of the shielding layer Sh away from the base substrate. The detection electrode Cap is electrically coupled to a fingerprint detection circuitry arranged on the driving circuitry layer.

The scheme in the embodiments of the present disclosure is applied to a self-capacitive fingerprint identification structure. As shown in FIG. 1, a fingerprint mainly includes valleys and ridges. When the fingerprint is pressed on the fingerprint identification substrate, equivalent capacitances are formed between the valley and the detection electrode Cap, and between the ridge and the detection electrode Cap. A distance between the valley and the fingerprint identification structure is different from a distance between the ridge and the fingerprint identification structure, so there is a difference between the formed capacitances. Through detecting and determining the difference, it is able to determine positions of the valleys and ridges of the fingerprint, and generate an image of the fingerprint, thereby achieve the fingerprint detection and identification.

The fingerprint identification substrate may be integrated with the other structures, for example, the fingerprint identification substrate may be integrated with a display substrate, so as to achieve a fingerprint identification function in a certain part of a display region of a display device. The fingerprint identification substrate may also be arranged separately to achieve the fingerprint identification function.

It should be appreciated that, in order to realize the fingerprint identification function, usually it is necessary to provide a corresponding driving circuitry. When the fingerprint identification substrate is integrated with the other structures, some driving circuitries also need to be provided. For example, the driving circuitry is a thin film transistor (TFT), a metal oxide semiconductor field effect transistor (MOS transistor), or a conductive line for driving a pixel unit in a display panel.

In order to avoid crosstalk between the detection electrode Cap and the driving circuitries, in the embodiments of the present disclosure, a shielding layer Sh is further arranged between the driving circuitry layer and the detection electrode Cap, the shielding layer Sh is insulated from the detection electrode Cap, and an orthogonal projection of the shielding layer Sh onto the base substrate at least partially overlaps an orthogonal projection of the detection electrode Cap onto the base substrate. In this way, it is able to reduce noise interference, improve the fingerprint collection accuracy, and prevent a signal in the driving circuitry at the driving circuitry layer from being adversely affected.

Figure 2:
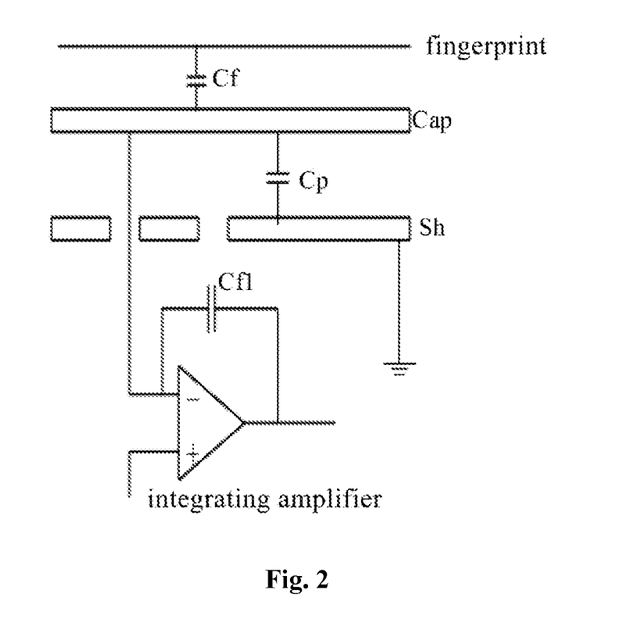
FIG. 2 is a circuit diagram of a fingerprint identification substrate according to one embodiment of the present disclosure.

As shown in FIG. 2, in the embodiments of the present disclosure, the shielding layer Sh is grounded, e.g., the shielding layer Sh is coupled to a grounded line. In this way, it is able to maintain a stable level of the shielding layer, thereby to reduce the noise interference, improve the fingerprint collection accuracy, and prevent the signal in the driving circuitry at the driving circuitry layer from being adversely affected.

As shown in FIG. 1, an equivalent capacitance between the fingerprint and the detection electrode Cap is Cf. To be specific, Cf includes an equivalent capacitance CR formed between the ridge of the fingerprint and the fingerprint identification substrate and an equivalent capacitance CV formed between the valley of the fingerprint and the fingerprint identification substrate, and an equivalent capacitance Cp is formed between the detection electrode Cap and the shielding layer Sh.

Ideally, when merely the capacitance Cf formed between the fingerprint and the detection electrode Cap is considered, the following formula is obtained based on a working principle of a charge integrating amplifier: Cf*(Vtx−Vref) =Cf1*(Vref−Vout) (1), where Cf represents the equivalent capacitance between the fingerprint and the detection electrode Cap, Vtx represents a driving voltage of the detection electrode Cap, Vref represents a reference voltage, Cf1 represents a feedback capacitance of the charge integrating amplifier, and Vout represents an output voltage of the charge integrating amplifier.

Based on formula (1), the following formula is obtained:

$$Vout = Vref - \frac{Cf*(Vtx - Vref)}{Cf1}. \tag{2}$$

However, in actual use, due to a parasitic capacitance Cp formed between the detection electrode Cap and the shielding layer Sh, the above formula (1) needs to be adjusted to (Cf+Cp)*(Vtx−Vref)=Cf1*(Vref−Vout) (3).

Based on formula (3), the following formula is obtained:

$$Vout = Vref - \frac{(Cf + Cp)*(Vtx - Vref)}{Cf1}. \tag{4}$$

In this regard, it is able to detect the fingerprint at a low cost, and as compared with the related art, it is able to increase a signal-to-noise ratio, thereby to improve the signal collection accuracy.

However, it is found through researches that, the finger touching the fingerprint identification substrate may be understood as virtual ground connection. When the detection electrode Cap is excited and charged, Cf and Cp will be charged or discharged simultaneously, so when the collected data is further integrated and amplified subsequently (for example, through an integration amplifier), Cf and Cp are integrated and amplified at the same time. However, for CR and CV, Cp is a same common-mode component, the capacitance difference between the valley and the ridge is not increased but a relative capacitance difference between the valley and the ridge becomes smaller. The above characteristic is expressed through (CR−CV)/CV>{(CR+Cp)− (CCp)}/(CCp) (5).

It should be appreciated that, in formula (4), generally, Cp is greater than or much greater than Cf, so the output signal Vout is pulled down. For the integrating amplifier, a normal operation output ranges from AVSSI to Vref+0.5V, where AVSSI refers to an interface standard voltage of a Small Scale Integrated Circuit (SSI). In the embodiments of the present disclosure, Vout ranges from 2.5V to 4.5V.

Figure 3:
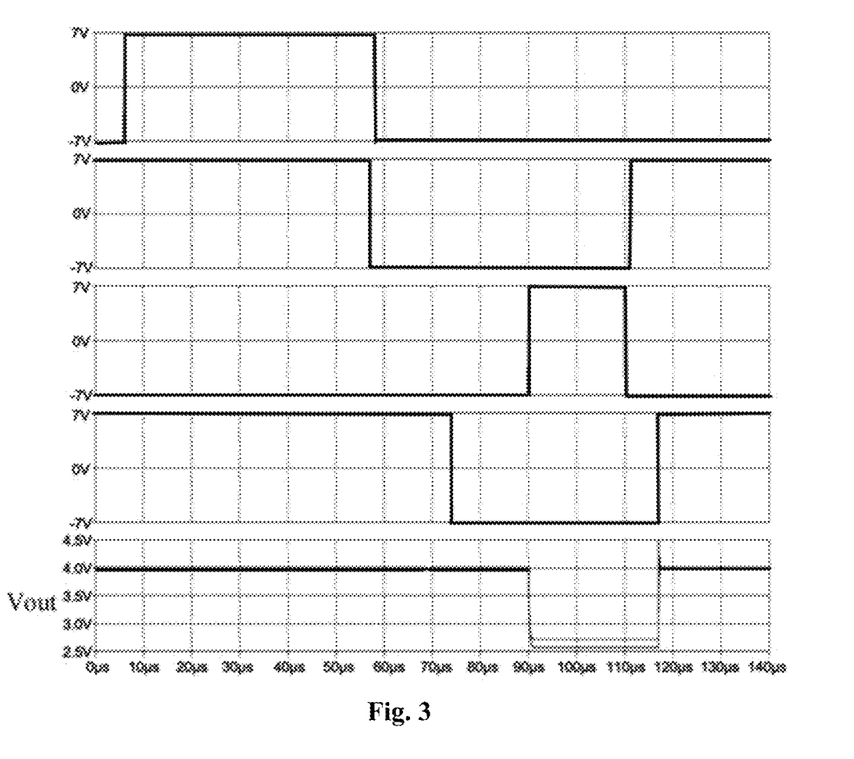
FIG. 3 is a schematic view showing a fingerprint detection voltage signal of the fingerprint identification substrate.
Figure 4:
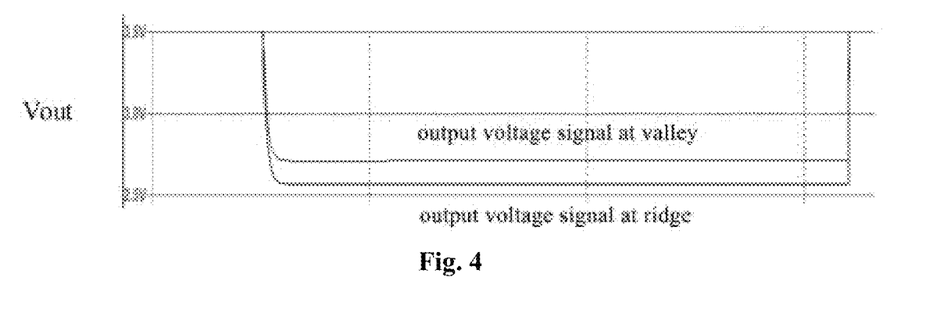
FIG. 4 is a partial enlarged view of FIG. 3.

FIG. 3 shows a voltage waveform diagram when the shielding layer Sh is grounded, and a last signal is a waveform diagram of the fingerprint output signal. FIG. 4 is a partial enlarged view of the waveform diagram of the fingerprint output signal. An upper waveform in FIG. 4 represents the output voltage signal at the valley, i.e., about 2.71V, and a lower waveform represents the output voltage signal at the ridge, i.e., about 2.56V, so an output signal corresponding to the valley and the ridge is small, i.e., merely 0.15 V. The output voltage signals corresponding to the valley and the ridge are pulled down, and they merely occupy a small part of an output range of an Active Front End (AFE) (i.e., a rectification/feedback unit), so a part of the output voltage signal is wasted, and an operation amplification factor of an AFE charge integrating amplifier is reduced.

Figure 5:
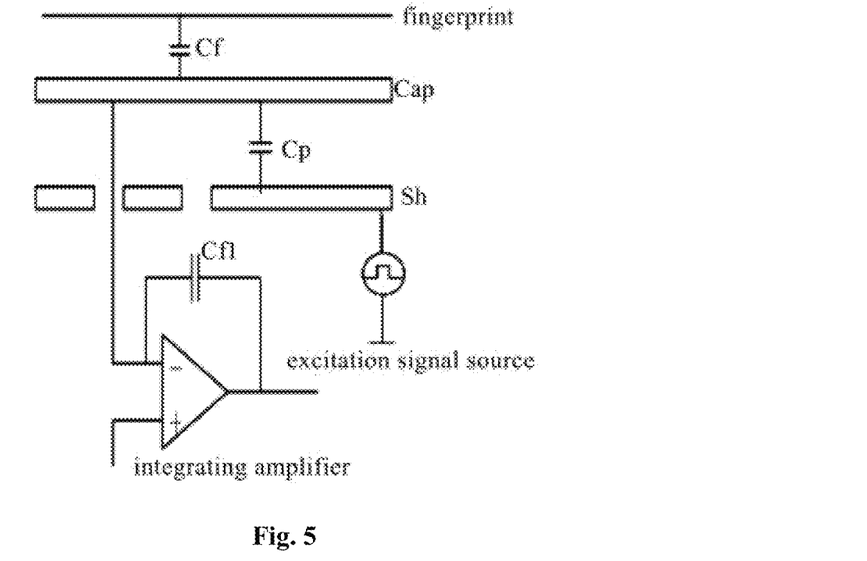
FIG. 5 is another circuit diagram of the fingerprint identification substrate according to one embodiment of the present disclosure.

In the embodiments of the present disclosure, as shown in FIG. 5, the shielding layer Sh is electrically coupled to an excitation signal source to obtain an excitation signal provided by the excitation signal source. The excitation signal is used to adjust a level difference between the detection electrode Cap and the shielding layer Sh, and enable a level of the detection electrode Cap to be the same as a level of the shielding layer Sh. In this way, a potential at one end of an equivalent capacitor formed between the detection electrode Cap and the shielding layer Sh is the same as a potential at the other end of the equivalent capacitor Cp, so as to inhibit charging and discharging of the equivalent capacitor Cp.

Figure 6:
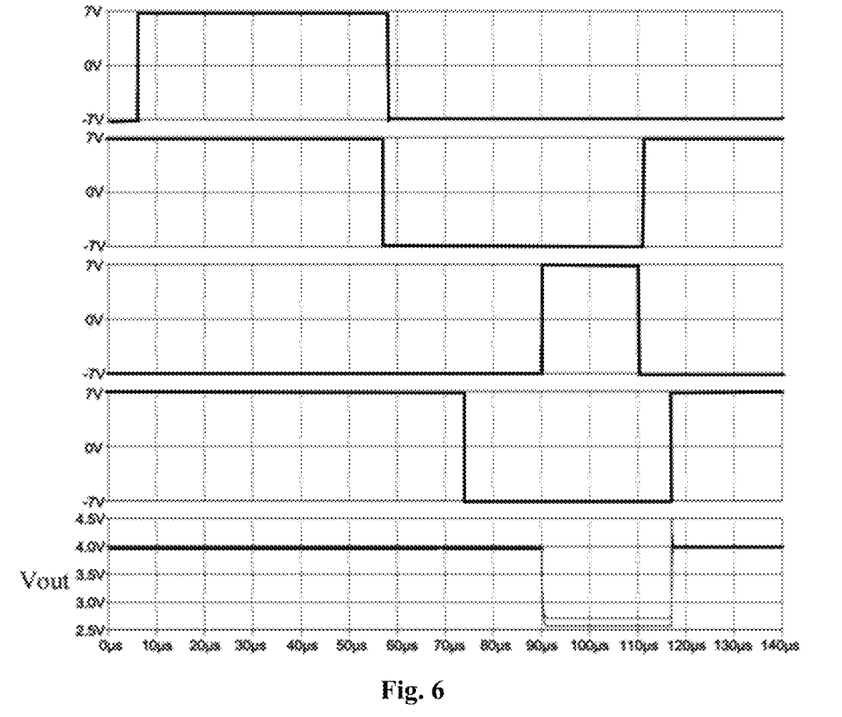
FIG. 6 is a schematic view showing a fingerprint detection voltage signal of the fingerprint identification substrate according to one embodiment of the present disclosure.
Figure 7:
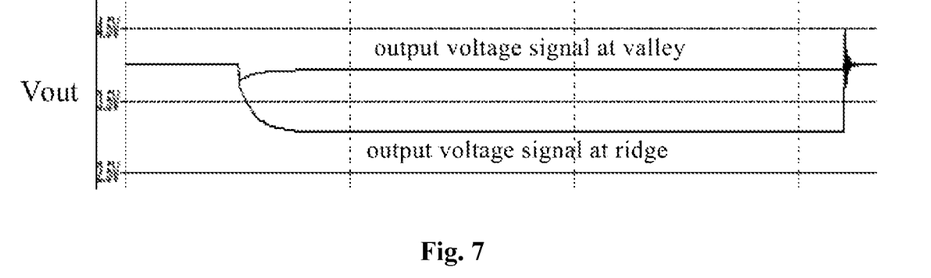
FIG. 7 is a partial enlarged view of FIG. 6.

FIG. 6 shows a voltage waveform diagram when the excitation signal is provided to the shielding layer Sh, and a last signal in FIG. 6 is a waveform diagram of the fingerprint output signal. FIG. 7 is a partial enlarged view of the waveform diagram of the fingerprint output signal. Through providing the excitation signal to the shielding layer Sh, it is able for the driving voltage Vtx applied to the detection electrode Cap to fully act on the equivalent capacitor Cf formed between the fingerprint and the detection electrode Cap, so as to reduce an active capacitance of the fingerprint identification substrate from Cf+Cp to Cf, thereby to increase the output voltage Vout. When the driving voltage Vtx is increased, it is able to provide a larger difference between the voltage signal corresponding to the valley and the voltage signal corresponding to ridge, thereby to increase the signal-to-noise ratio. As shown in FIG. 7, in the embodiments of the present disclosure, an upper waveform represents the output voltage signal of the valley, i.e., about 3.93V, and a lower waveform represents the output voltage signal of the ridge, i.e., about 3.07V, so an output signal corresponding to the valley and the ridge is increased to about 0.86 V.

According to the fingerprint identification substrate in the embodiments of the present disclosure, through the shielding layer Sh, it is able to avoid crosstalk between the fingerprint identification substrate and the driving circuitry in the driving circuitry layer, thereby to improve the reliability of the fingerprint identification substrate. In addition, the shielding layer Sh is electrically coupled to the excitation signal source to obtain the excitation signal provided by the excitation signal source, so through applying the excitation signal to the shielding layer Sh, it is able to increase the signal-to-noise ratio, thereby to improve the signal collection accuracy.

Figure 8:
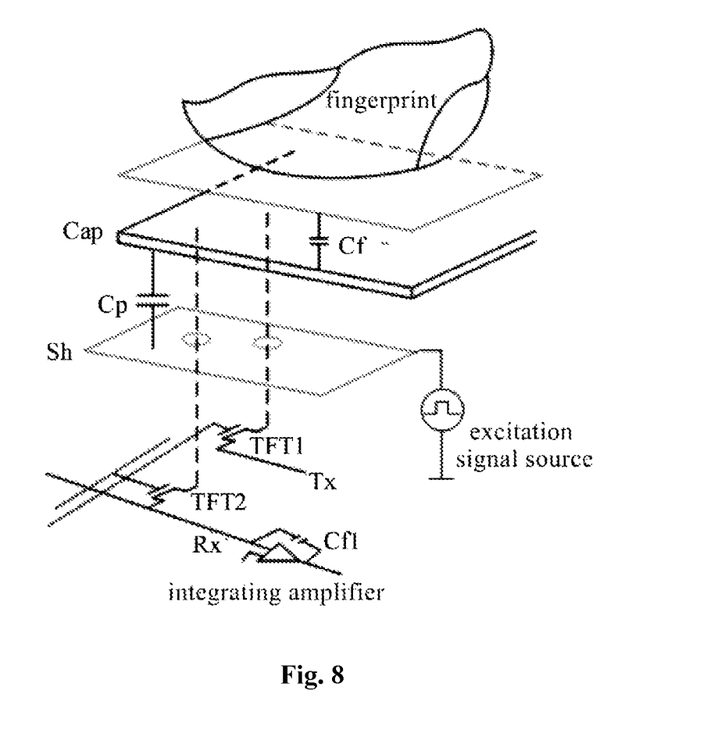
FIG. 8 is a schematic view showing the fingerprint identification substrate according to one embodiment of the present disclosure.
Figure 9:
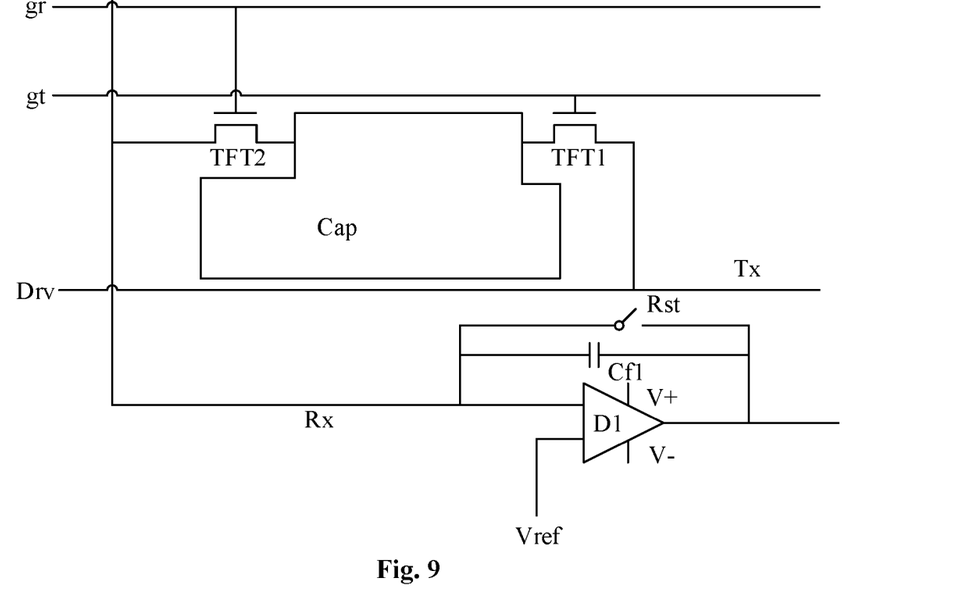
FIG. 9 is a circuit diagram of a fingerprint identification circuitry according to one embodiment of the present disclosure.

As shown in FIG. 8 and FIG. 9, in the embodiments of the present disclosure, the fingerprint detection circuitry includes a first switching transistor TFT1, a second switching transistor TFT2 and an output circuitry. Each of the first switching transistor TFT1 and the second switching transistor TFT2 includes a control electrode, a first electrode and a second electrode.

The control electrode of the first switching transistor TFT1 is coupled to a charge control signal source obtain a charge control signal gt, the first electrode of the first switching transistor TFT1 is coupled to a charge signal source to obtain a charge signal Drv, i.e., the above driving voltage Vtx (the first electrode of the first switching transistor TFT1 may also be understood as an input end Tx of the fingerprint detection circuitry), and the second electrode of the first switching transistor TFT1 is electrically coupled to the detection electrode Cap. The control electrode of the second switching transistor TFT2 is electrically coupled to a discharge detection control signal source to obtain a discharge detection control signal gr, the first electrode of the second switching transistor TFT2 is electrically coupled to the detection electrode Cap, and the second electrode of the second switching transistor TFT2 is electrically coupled to the output circuitry (the second electrode of the second switching transistor TFT2 may also be understood as an output end Rx of the fingerprint detection circuitry). The output circuitry is configured to output a collected fingerprint signal.

In the embodiments of the present disclosure, the output circuitry includes an amplifier and a feedback capacitor CF1. Here, the amplifier may be a differential amplifier, and the differential amplifier and the feedback capacitor CF1 form the integrating amplifier.

The amplifier includes a positive electrode, a negative electrode and an output electrode. The negative electrode of the amplifier is coupled to the second electrode of the second switching transistor TFT2, the positive electrode of the amplifier is coupled to a reference signal source to obtain a reference signal Vref, and the output electrode of the amplifier is coupled to an output signal end to output the collected fingerprint signal. A first end of the feedback capacitor CF1 is coupled to the negative electrode of the amplifier, and a second end of the feedback capacitor CF1 is coupled to the output electrode of the amplifier. In this regard, through the output circuitry, it is able to amplify and output the fingerprint signal from the fingerprint detection circuitry.

In the embodiments of the present disclosure, the output circuitry further includes a reset sub-circuitry, two ends of the reset sub-circuitry are coupled to the negative electrode and the output electrode of the amplifier respectively, and the reset sub-circuitry is configured to enable the negative electrode of the amplifier to be electrically coupled to or electrically decoupled from the output electrode of the amplifier under the control of a reset signal Rst.

During the operation, the first switching transistor TFT1 transmits the charge signal Drv to the detection electrode Cap under the control of the charge control signal gt, and the charge signal Drv may also be understood as the driving voltage Vtx of the detection electrode Cap. Further, the fingerprint signal detected by the detection electrode Cap is transmitted to the output circuitry through the second switching transistor TFT2 under the control of the discharge detection control signal gr, and then amplified and outputted through the output circuitry.

In the embodiments of the present disclosure, the detection electrode Cap is electrically coupled to the first switching transistor TFT1 and the second switching transistor TFT2 through a via hole penetrating through the shielding layer Sh. The orthogonal projection of the shielding layer Sh onto the base substrate covers an orthogonal projection of a semiconductor layer of the first switching transistor TFT1 onto the base substrate, and the orthogonal projection of the shielding layer Sh onto the base substrate covers an orthogonal projection of a semiconductor layer of the second switching transistor TET2 onto the base substrate.

Figure 10:
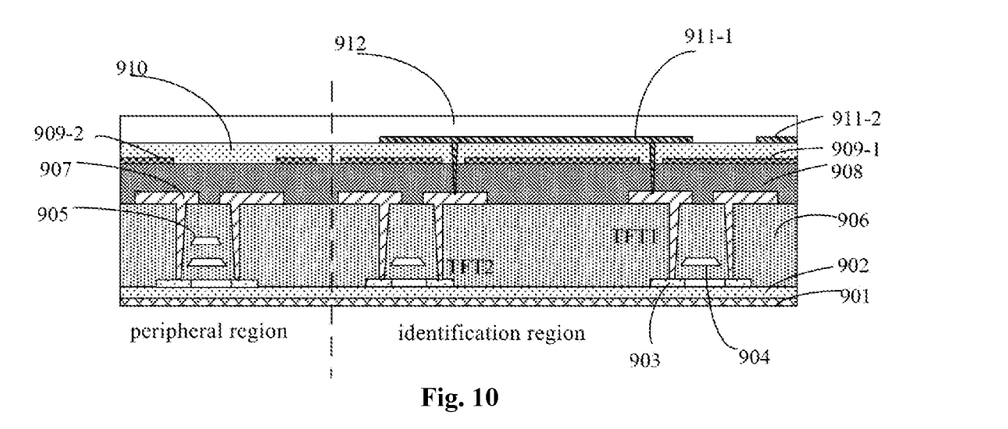
FIG. 10 is another schematic view showing the fingerprint identification substrate according to one embodiment of the present disclosure.
Figure 11:
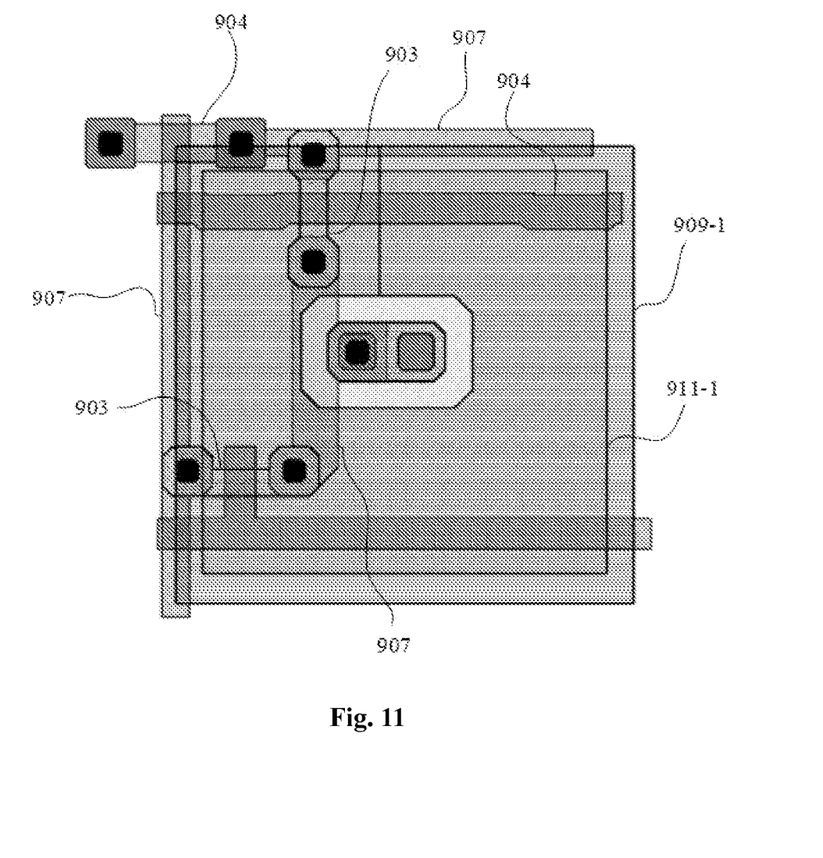
FIG. 11 is yet another schematic view showing the fingerprint identification substrate according to one embodiment of the present disclosure.
Figure 12:
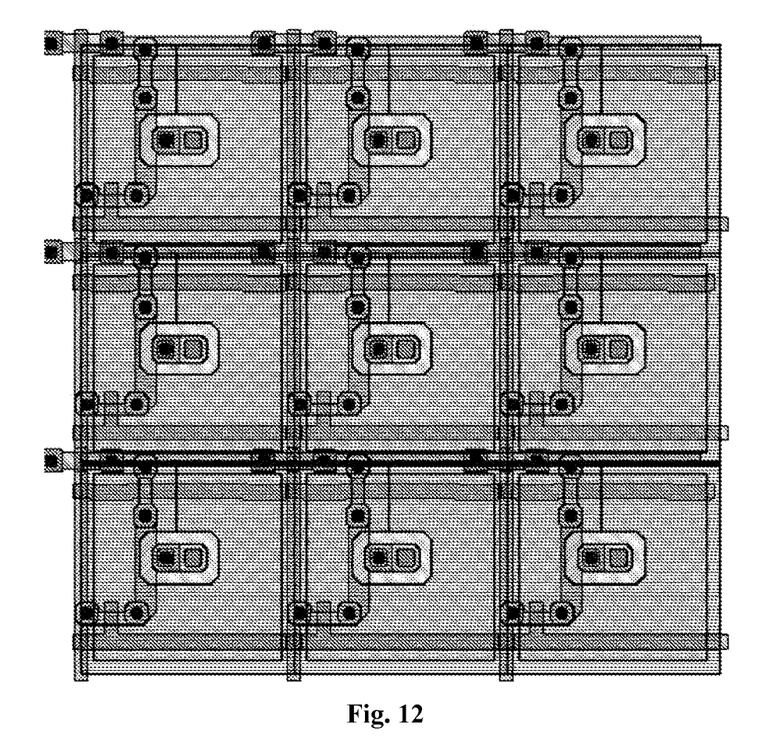
FIG. 12 is still yet another schematic view showing the fingerprint identification substrate according to one embodiment of the present disclosure.

As shown in FIG. 10 to FIG. 12, in the embodiments of the present disclosure, the fingerprint identification substrate includes a base substrate 901, and the substrate 901 may be made of transparent polyimide (PI) or ultra-thin glass (UTG). A driving circuitry layer is further formed on the base substrate 901, and it mainly includes a buffer layer 902, a semiconductor layer 903, a first gate metal layer 904, a second gate metal layer 905, and a laminated structure 906. To be specific, the laminated structure 906 includes a gate insulation layer and an interlayer dielectric layer.

The first gate metal layer 904 includes a plurality of first gate electrode patterns and first signal line patterns, the second gate metal layer 905 includes a plurality of second gate electrode patterns, and the first gate electrode pattern and the second gate electrode pattern form a gate electrode of a switching transistor. For example, gate electrodes of a switching transistor with a double-gate structure are formed by the first gate electrode pattern and the second gate electrode pattern, a gate electrode of a conventional switching transistor with a single-gate structure is formed by the first gate electrode pattern or the second gate electrode pattern.

The first signal line pattern is used to form one or more of: a first signal line configured to transmit a charge control signal provided by the charge control signal source; and a second signal line configured to transmit a discharge detection control signal provided by the discharge detection control signal source.

To be specific, the gate insulation layer includes a first gate insulation sub-layer and a second gate insulation sub-layer, and the driving circuitry layer further includes a first source/drain metal layer 907 and a first organic planarization layer 908. The first source/drain metal layer 907 includes a source/drain pattern and a second signal line pattern, the source/drain pattern forms a source electrode and a drain electrode of the switching transistor, and the driving circuitry layer is used to form the first switching transistor TFT1, the second switching transistor TFT2 and the other structures.

The second signal line pattern is used to form one or more of: a third signal line configured to transmit the charge signal provided by the charge signal source; and a fourth signal line configured to output a signal detected by the detection electrode.

A second source/drain metal layer is further formed on the base substrate 901, the second source/drain metal layer includes a third signal line pattern and a shielding layer pattern, and the shielding layer pattern of the second source/drain metal layer is used to form a shielding layer 909-1 (i.e., the above shielding layer Sh). A second organic planarization layer 910, a detection electrode 911-1 and a detection electrode 911-2 (i.e., the above detection electrodes Cap), a packaging protection layer 912 are further formed on the base substrate 901.

In the embodiments of the present disclosure, as shown in FIG. 11, the shielding layer pattern includes a parting line 909-11 extending from the via hole to an edge of the shielding layer pattern.

In the embodiments of the present disclosure, the parting line penetrates through the shielding layer pattern. It should be appreciated that, the shielding layer pattern needs to be provided with a via hole, and each shielding layer pattern is of an annular shape. Through the parting line, it is able to release a stress, thereby to avoid deformation of the shielding layer pattern. At the same time, the shielding layer patterns are formed on the first organic planarization layer 908, so the via hole also needs to serve as an exhaust hole in the first organic planarization layer 908 in a high-temperature process possibly involved. The parting line serves as an auxiliary exhaust region for the exhaust hole, so it is able to improve an exhaust effect and reduce a possible influence on the via hole, thereby to improve the connection reliability at the via hole.

The first electrode layer includes a plurality of first electrode patterns forming the detection electrode 911-1 and the detection electrode 911-2. The detection electrode 911-1 and the detection electrode 911-2 may be understood as detection electrodes of different detection units. A structure in FIG. 11 is a fingerprint detection unit. The fingerprint identification substrate in FIG. 12 includes a plurality of fingerprint detection units, and each fingerprint detection unit is configured to detect fingerprint information about a point, i.e., a valley or a ridge. Based on the information detected by the plurality of fingerprint detection units, it is able to obtain complete fingerprint information.

In the embodiments of the present disclosure, the fingerprint identification substrate includes a plurality of signal lines. Here, the signal line is a signal line 909-2 in FIG. 10, and the plurality of signal lines is arranged at a same layer and made of a same material as the shielding layer Sh.

As shown in FIG. 10, the third signal line pattern is used to form a data line 909-2 of the driving circuitry to transmit a driving signal. Here, the driving circuitry may be a Gate on Array (GOA).

The present disclosure further provides in some embodiments an electronic apparatus including the above-mentioned fingerprint identification substrate.

In the embodiments of the present disclosure, the electronic apparatus further includes one or more of the excitation signal source, the charge control signal source, the charge signal source, and the discharge detection control signal source, so as to provide corresponding signals.

As shown in FIG. 10, in the embodiments of the present disclosure, the fingerprint identification substrate includes an identification region and a peripheral region, both the shielding layer Sh and the detection electrode Cap are arranged in the identification region, and the excitation signal source, the charge control signal source, the charge signal source and the discharge detection control signal source are arranged in the peripheral region.

The electronic apparatus in the embodiments in the present disclosure may be a display device, and the fingerprint identification substrate may be integrated with a display substrate of the display device, so as to achieve the fingerprint identification function in a specific region of the display substrate. The implementation of the electronic apparatus may refer to that of the above-mentioned fingerprint identification substrate with a same technical effect, and thus will not be particularly defined herein.

It should be appreciated that, in the case of no conflict, the technical features in the embodiments of the present disclosure may also be applied to the other embodiments with a same or similar technical effect, which will not be particularly defined herein.

The present disclosure further provides in some embodiments a fingerprint identification method for the above-mentioned electronic apparatus, including: inputting, by the excitation signal source, the excitation signal to the shielding layer and obtaining, by the detection electrode, a fingerprint signal; and generating fingerprint information in accordance with the fingerprint signal.

In the embodiments of the present disclosure, during the operation, the excitation signal is input to the shielding layer, and the excitation signal is used to adjust a level difference between the detection electrode and the shielding layer, so as to enable a level of the detection electrode to be the same as a level of the shielding layer. As a result, a potential at one end of an equivalent capacitor formed between the detection electrode and the shielding layer is the same as a potential at the other end of the equivalent capacitor, so as to inhibit charging and discharging of the equivalent capacitor, thereby to improve the fingerprint identification accuracy.

In the embodiments of the present disclosure, the fingerprint identification substrate includes the above output circuitry and reset circuitry. The inputting, by the excitation signal source, the excitation signal to the shielding layer and obtaining, by the detection electrode, the fingerprint signal includes inputting the excitation signal to the shielding layer, inputting the charge control signal to the control electrode of the first switching transistor, inputting the charge signal to the first electrode of the first switching transistor, inputting the discharge detection control signal to the control electrode of the second switching transistor, inputting the reset signal to the reset sub-circuitry, and receiving the fingerprint signal output by the output circuitry. A rising edge of the excitation signal corresponds to a falling edge of the reset signal and a rising edge of the charge control signal, a rising edge of the reset signal corresponds to a falling edge of the charge control signal and a falling edge of the charge signal, a falling edge of the excitation signal is arranged after the rising edge of the reset signal, a falling edge of an initial reset signal is arranged between the rising edge of the reset signal and the falling edge of the excitation signal, a rising edge of the discharge detection control signal corresponds to the falling edge of the excitation signal and the falling edge of the charge signal, a rising edge of the charge signal is arranged after the falling edge of the excitation signal and corresponds to a falling edge of the discharge detection control signal, a rising edge of the initial reset signal is arranged after the falling edge of the discharge detection control signal, a start of the fingerprint signal corresponds to the rising edge of the discharge detection control signal, and an end of the fingerprint signal corresponds to the falling edge of the initial reset signal.

In FIG. 6, a first row represents the excitation signal Vcp, a second row represents the reset signal rst, a third row represents the charge signal Drv, a fourth row represents the charge control signal gt, a fifth row represents an input signal Vin of the fingerprint identification substrate, a sixth row represents a discharge detection control signal gr, and a seventh row represents a fingerprint signal Vout amplified by an amplification circuitry.

Figure 13:
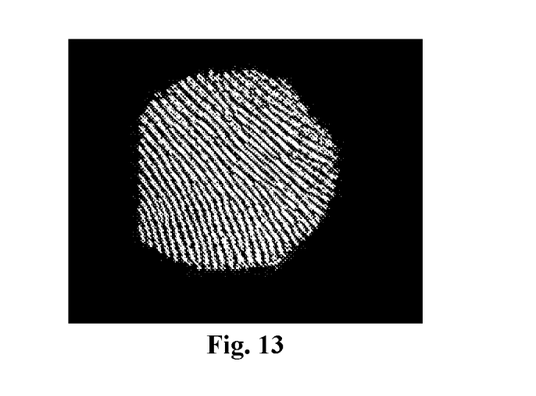
FIG. 13 is a schematic view showing the detection of a virtual fingerprint according to one embodiment of the present disclosure.

According to the embodiments of the present disclosure, it is able to improve the fingerprint identification accuracy. FIG. 13 shows a fingerprint image obtained in accordance with the fingerprint signal after detecting a virtual fingerprint, and the fingerprint image has a high definition.

It should be appreciated that, the fingerprint image in FIG. 13 is randomly generated, which does not involve any personal privacy information.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A fingerprint identification substrate, comprising a base substrate, a driving circuitry layer arranged on the base substrate, a shielding layer arranged at a side of the driving circuitry layer away from the base substrate and a detection electrode arranged at a side of the shielding layer away from the base substrate, wherein the detection electrode is electrically coupled to a fingerprint detection circuitry arranged on the driving circuitry layer, the shielding layer is insulated from the detection electrode, and an orthogonal projection of the shielding layer onto the base substrate at least partially overlaps an orthogonal projection of the detection electrode onto the base substrate;

wherein the fingerprint detection circuitry comprises a first switching transistor, a second switching transistor and an output circuitry; each of the first switching transistor and the second switching transistor comprises a control electrode, a first electrode and a second electrode; the control electrode of the first switching transistor is directly coupled to a charge control signal source, the first electrode of the first switching transistor is coupled to a charge signal source, and the second electrode of the first switching transistor is electrically coupled to the detection electrode; the control electrode of the second switching transistor is electrically coupled to a discharge detection control signal source, the first electrode of the second switching transistor is electrically coupled to the detection electrode, and the second electrode of the second switching transistor is electrically coupled to the output circuitry; and the output circuitry is configured to output a collected fingerprint signal.

2. The fingerprint identification substrate according to claim 1, wherein the shielding layer is coupled to a grounded line.

3. The fingerprint identification substrate according to claim 1, wherein the shielding layer is electrically coupled to an excitation signal source to obtain an excitation signal from the excitation signal source.

4. The fingerprint identification substrate according to claim 1, wherein the output circuitry comprises an amplifier and a feedback capacitor; the amplifier comprises a positive electrode, a negative electrode and an output electrode, the negative electrode of the amplifier is coupled to the second electrode of the second switching transistor, the positive electrode of the amplifier is coupled to a reference signal source, and the output electrode of the amplifier is coupled to an output signal end to output the collected fingerprint signal; and a first end of the feedback capacitor is coupled to the negative electrode of the amplifier, and a second end of the feedback capacitor is coupled to the output electrode of the amplifier.

5. The fingerprint identification substrate according to claim 4, wherein the output circuitry further comprises a reset sub-circuitry, two ends of the reset sub-circuitry are coupled to the negative electrode and the output electrode of the amplifier respectively, and the reset sub-circuitry is configured to enable the negative electrode of the amplifier to be electrically coupled to or electrically decoupled from the output electrode of the amplifier under the control of a reset signal.

6. The fingerprint identification substrate according to claim 1, wherein the detection electrode is electrically coupled to the first switching transistor and the second switching transistor through a via hole penetrating through the shielding layer, the orthogonal projection of the shielding layer onto the base substrate covers an orthogonal projection of a semiconductor layer of the first switching transistor onto the base substrate, and the orthogonal projection of the shielding layer onto the base substrate covers an orthogonal projection of a semiconductor layer of the second switching transistor onto the base substrate.

7. The fingerprint identification substrate according to claim 6, wherein the fingerprint identification substrate comprises a first gate metal layer, a second gate metal layer, a first source/drain metal layer, a second source/drain metal layer and a first electrode layer in a direction away from the base substrate, the first gate metal layer comprises a plurality of first gate electrode patterns and first signal line patterns, the second gate metal layer comprises a plurality of second gate electrode patterns, the first gate electrode pattern and the second gate electrode pattern form a gate electrode of a switching transistor, the first source/drain metal layer comprises a source/drain pattern and a second signal line pattern, the second source/drain metal layer comprises a shielding layer pattern, the source/drain pattern forms a source electrode and a drain electrode of the switching transistor, the shielding layer pattern forms the shielding layer, the first electrode layer comprises a plurality of first electrode patterns, and the first electrode pattern forms the detection electrode.

8. The fingerprint identification substrate according to claim 7, wherein the shielding layer pattern comprises a parting line extending from the via hole to an edge of the shielding layer pattern.

9. The fingerprint identification substrate according to claim 7, wherein the first signal line pattern is configured to form one or more of: a first signal line configured to transmit a charge control signal provided by the charge control signal source; and a second signal line configured to transmit a discharge detection control signal provided by the discharge detection control signal source.

10. The fingerprint identification substrate according to claim 7, wherein the second signal line pattern is configured to form one or more of: a third signal line configured to transmit a charge signal provided by the charge signal source; and a fourth signal line configured to output a signal detected by the detection electrode.

11. An electronic apparatus, comprising the fingerprint identification substrate according to claim 1.

12. The electronic apparatus according to claim 11, wherein the fingerprint identification substrate comprises an identification region and a peripheral region, both the shielding layer and the detection electrode are arranged in the identification region, and the peripheral region is provided with one or more of the excitation signal source, the charge control signal source, the charge signal source, and the discharge detection control signal source.

13. A fingerprint identification method for the electronic apparatus according to claim 11, comprising: inputting, by the excitation signal source, the excitation signal to the shielding layer and obtaining, by the detection electrode, a fingerprint signal; and generating fingerprint information in accordance with the fingerprint signal.

14. The fingerprint identification method according to claim 13, wherein the inputting, by the excitation signal source, the excitation signal to the shielding layer and obtaining, by the detection electrode, the fingerprint signal comprises inputting the excitation signal to the shielding layer, inputting the charge control signal to the control electrode of the first switching transistor, inputting the charge signal to the first electrode of the first switching transistor, inputting the discharge detection control signal to the control electrode of the second switching transistor, inputting the reset signal to the reset sub-circuitry, and receiving the fingerprint signal from the output circuitry, wherein a rising edge of the excitation signal corresponds to a falling edge of the reset signal and a rising edge of the charge control signal, a rising edge of the reset signal corresponds to a falling edge of the charge control signal and a falling edge of the charge signal, a falling edge of the excitation signal is located after the rising edge of the reset signal, a falling edge of an initial reset signal is located between the rising edge of the reset signal and the falling edge of the excitation signal, a rising edge of the discharge detection control signal corresponds to the falling edge of the excitation signal and the falling edge of the charge signal, a rising edge of the charge signal is located after the falling edge of the excitation signal and corresponds to a falling edge of the discharge detection control signal, a rising edge of the initial reset signal is located after the falling edge of the discharge detection control signal, a start of the fingerprint signal corresponds to the rising edge of the discharge detection control signal, and an end of the fingerprint signal corresponds to the falling edge of the initial reset signal.

15. The fingerprint identification substrate according to claim 2, wherein the fingerprint detection circuitry comprises a first switching transistor, a second switching transistor and an output circuitry; each of the first switching transistor and the second switching transistor comprises a control electrode, a first electrode and a second electrode; the control electrode of the first switching transistor is coupled to a charge control signal source, the first electrode of the first switching transistor is coupled to a charge signal source, and the second electrode of the first switching transistor is electrically coupled to the detection electrode; the control electrode of the second switching transistor is electrically coupled to a discharge detection control signal source, the first electrode of the second switching transistor is electrically coupled to the detection electrode, and the second electrode of the second switching transistor is electrically coupled to the output circuitry; and the output circuitry is configured to output a collected fingerprint signal.

16. The fingerprint identification substrate according to claim 3, wherein the fingerprint detection circuitry comprises a first switching transistor, a second switching transistor and an output circuitry; each of the first switching transistor and the second switching transistor comprises a control electrode, a first electrode and a second electrode; the control electrode of the first switching transistor is coupled to a charge control signal source, the first electrode of the first switching transistor is coupled to a charge signal source, and the second electrode of the first switching transistor is electrically coupled to the detection electrode; the control electrode of the second switching transistor is electrically coupled to a discharge detection control signal source, the first electrode of the second switching transistor is electrically coupled to the detection electrode, and the second electrode of the second switching transistor is electrically coupled to the output circuitry; and the output circuitry is configured to output a collected fingerprint signal.

17. The electronic apparatus according to claim 11, wherein the shielding layer is coupled to a grounded line.

18. The electronic apparatus according to claim 11, wherein the shielding layer is electrically coupled to an excitation signal source to obtain an excitation signal from the excitation signal source.

19. The electronic apparatus according to claim 11, wherein the fingerprint detection circuitry comprises a first switching transistor, a second switching transistor and an output circuitry; each of the first switching transistor and the second switching transistor comprises a control electrode, a first electrode and a second electrode; the control electrode of the first switching transistor is coupled to a charge control signal source, the first electrode of the first switching transistor is coupled to a charge signal source, and the second electrode of the first switching transistor is electrically coupled to the detection electrode; the control electrode of the second switching transistor is electrically coupled to a discharge detection control signal source, the first electrode of the second switching transistor is electrically coupled to the detection electrode, and the second electrode of the second switching transistor is electrically coupled to the output circuitry; and the output circuitry is configured to output a collected fingerprint signal.

* * * * *